Nov. 28, 1950 — J. P. JONES — 2,531,630
CREAM REMOVER
Filed June 18, 1945
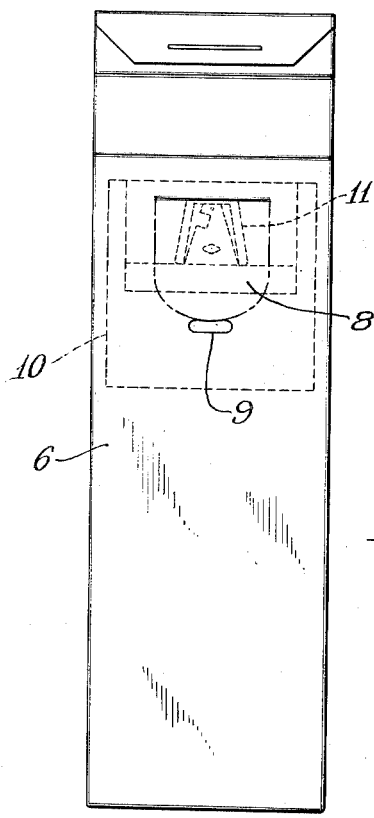
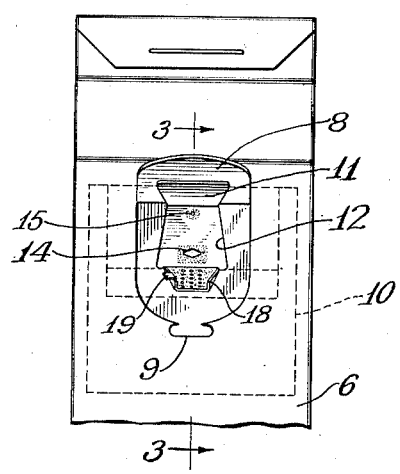
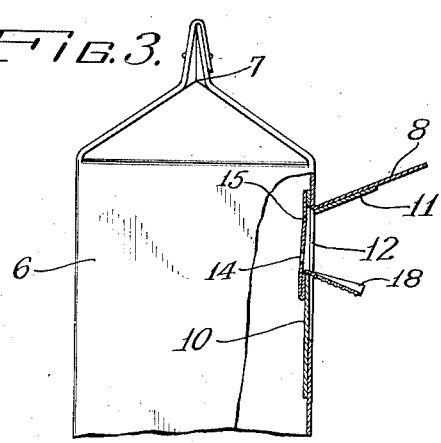
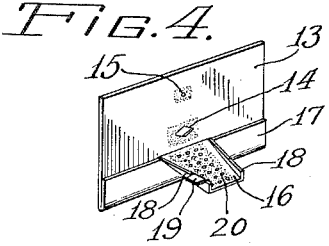
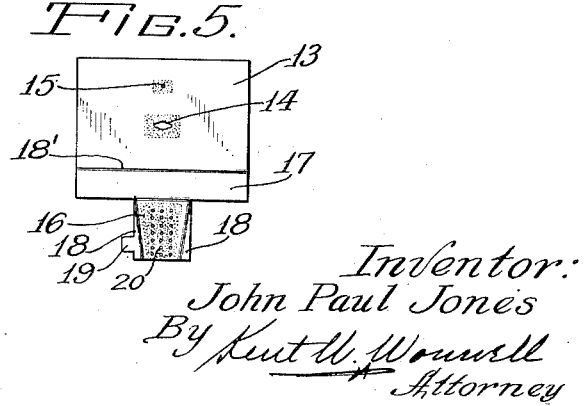
Inventor:
John Paul Jones
By Kent W. Worrell
Attorney Patented Nov. 28, 1950

2,531,630

UNITED STATES PATENT OFFICE 2,531,630

CREAM REMOVER

John Paul Jones, Omaha, Nebr., assignor to Dairy Specialties, Inc., a corporation of Nebraska Application June 18, 1945, Serial No. 600,046

9 Claims. (Cl. 222—528)

This invention relates in general to a cream discharging device incorporated in a container or a receptacle as it is made, and opened and placed in operation when desired.

An important object of the invention is to provide a cream dispensing opening in connection with a milk container of the paper bottle type.

A further object of the invention is to apply a cream remover to an ordinary dispensing opening of a milk container of the paper bottle type.

A still further object of the invention is to provide a cream remover attachment for a milk container of the paper bottle type having a discharge spout, a discharge opening and an air inlet all normally sealed within the container and only accessible after the opening of an ordinary type of milk pour-off opening as applied to paper bottles of this type.

Other objects of the invention will appear in the specification and will be apparent from the accompanying drawings in which Fig. 1 is a side elevation of a paper bottle type of container to which the present invention is shown applied in dotted outline.

Fig. 2 is a side elevation of container Fig. 1 with the pouring device raised and the cream remover spout turned downwardly in pouring position.

Fig. 3 is a side elevation of the structure shown in Fig. 2, with a portion thereof shown in section as taken on the line 3—3 of Fig. 2.

Fig. 4 is a perspective view of the cream remover insert as applied to the inside of the paper bottle; and Fig. 5 shows a blank from which the insert of Fig. 4 is made.

By locating a paper bottle pouring aperture in the side of a container near the cream level at the top thereof, a new and improved cream remover is provided by incorporating a folded sheet at the inside of the container which is sealed in place and provides not only a pouring aperture but also an air admission opening and a pouring spout which additionally seals the pouring aperture and the air admission opening, both of which are uncovered by the downward movement or opening of the pouring spout.

Referring now more particularly to the drawings, a milk container 6 of the waxed paper type having a staple sealed top 7 is provided with a side pouring aperture located at a distance slightly below the top to embrace the upper and lower levels of the cream which accumulates near the top of the container. The pouring opening comprises a partially severed flap 8 in the wall having a rounded lower end with a recess 9 at the bottom into which the finger nail or a pointed instrument may be inserted for lifting the flap to open it. Inside of the container and of a size to extend entirely over the opening produced by the flap 8 and the recess 9 is a sheet or strip 10 of similar material adhesively attached to the inner surface of the wall of the container having a tab 11 of smaller size than the flap 8 but adhering thereto and engaged approximately on the same line as that of the flap so that when the flap is raised the tab will be raised also normally uncovering a pouring opening 12 of the same size as the tab itself.

Adhesively applied to the inside of the sheet or strip 10 is the cream remover attachment which comprises a sheet 13 of paper or paper-like material having a cream discharging opening 14 located medially of the main portion of the sheet with a pin hole 15 at a distance from it toward the upper edge as placed in the container and with an extension to form a spout 16 carried at the outer edge of an integral hinged portion 17. The spout has a folded line at each side to form tapered side walls 18, and when the portion 17 is folded upwardly the spout 16 will extend upwardly and cover both the cream discharging opening 14 and the air admission pin hole 15.

The spout 16 is preferably formed with tapered side walls 18 foldable inwardly and one of the side walls may have an extension 19 near its outer end which may be engaged by the finger nail of an operator or by a pointed instrument to assist in moving the spout outwardly. This cream remover insert will be adhesively attached to the inside of the sheet or strip 10 so that the spout 16 will extend through the opening 12 and when paraffin or wax is applied to the inside surfaces of the wall of the container a small amount of the material will extend through the pin hole 15 and the discharge opening 14 thus adhesively securing the overlying spout 16 and closing these openings.

To remove cream from the container the flap 8 is raised in the ordinary manner which carries with it the tab 11 thus uncovering the cream remover spout which is held in closed position sealing the openings 14 and 15 by engaging the projection 19 of the spout or engaging the spout itself and pulling it downwardly. The openings 14 and 15 will both be opened and cream will ordinarily discharge from the opening 14 into the spout which directs the cream into a glass or other container at the side of the milk bottle. Thus it is apparent that the holes will be sealed at the time wax or paraffin is spread over the inner and outer surfaces of the carton providing a triple seal through the three walls of the container. The paraffin adheres to the pouring spout through openings 14 and 15 and is removed from them when the spout is moved downwardly leaving both holes open one to let the air in and the other to let the cream out. If desired the pouring spout may be formed with slight indentations 20 along the center which tend to attract, receive, and direct the cream to the central portion of the spout where the indentations appear.

With this type of cream remover the container may be set in an upright position without disturbing the contents which allows the cream to collect at the top of the container and the flap and cream remover may be opened and set in position without materially agitating or disturbing the contents of the container which tends to mix the cream with the milk.

To close the cream remover it is necessary only to raise the spout, to fold down the flap 8 and to press it centrally of the flap causing the edges thereof to engage sufficiently to hold the flap and the tab in position. In this position the container is sealed by a triple seal as above set forth which may not be air tight but is sufficiently tight to prevent the admission of dirt and fine material.

Milk may also be poured from the cream discharging opening or if desired since the cream remover is usually of thin paper stock it may be punched inwardly or torn from the opening 12 to discharge milk more freely.

Various changes in the construction, combination and arrangement of the several parts may be made without departing from the spirit and scope of the invention.

I claim:

1. The combination with a paper milk bottle having a wall with a pouring aperture and a hinged flap and an inner wall strip attached to the inside surface of the wall with an opening and a hinged tab adhering thereto and opening therewith, of a cream draw-off attachment comprising a paper-like sheet secured over the inner wall strip opening and having a lower discharge opening at the lower cream level and an air inlet opening above the upper cream level.

2. A paper milk container having an attached inner wall strip with a pouring opening closed by a hinged tab, an outer wall with an opening closed by a flap attached to the tab, and a paper-like sheet attached to the inner wall strip and extending over the opening therein with a dispensing opening at the lower cream level and an air inlet opening at the upper cream level and both sealed when the tab is closed.

3. A paper milk container having an attached inner wall strip and outer wall with registering apertures closed by hinged flaps adhesively attached for opening and closing together, and a cream draw-off attachment comprising a paper-like sheet adhesively attached to the inner wall strip and overlying the aperture therein with a discharge opening at the lower cream line at the bottom of the aperture and a small air inlet opening above the upper cream line near the top of the aperture.

4. The combination with a milk container having an attached inner strip and an outer wall with registering apertures closed by hinged flaps which are adhesively attached for opening and closing movement together, of a paper-like sheet adhesively applied to the inside of the inner strip and overlying the apertures with a discharge opening at the lower cream level and an air inlet opening above the upper cream level, and the sheet having an extension forming a discharge spout movable downwardly below the discharge opening when the flaps are raised.

5. A milk container having an attached inner strip and an outer wall with registering pouring apertures closed by hinged flaps adhesively secured together for opening and closing movement, a paper-like sheet attached to the inside of the inner strip and extending over the apertures, the sheet having a lower cream discharge opening and an upper air inlet opening in that portion over the apertures and a discharge spout folded upwardly from below the discharge opening to overlie the discharge and air inlet openings and movable downwardly when the flaps are raised, and a wax like coating applied to the inside of the container and extending through said openings for holding the spout upwardly and sealing the openings.

6. A paper like cream draw-off attachment for a paper milk bottle having a pouring aperture comprising a wall with a hinged flap to close an opening, a strip secured to the inside surface of the wall to cover the opening and having a flap which is adhesively attached to the wall flap to open therewith, both flaps sealed with a wax coating, said attachment comprising a sheet attached to the said strip and having a pouring opening and an air inlet opening located in the aperture and having a pouring spout folded upwardly over the two openings and held over them in sealing relation by a wax coating applied to the inside and extending through the openings against the spout, the seals for the two openings being broken when the spout is disengaged and turned downwardly.

7. A paper-like cream draw-off attachment for the inside of a paper milk container having a pouring aperture comprising an outer wall with a hinged flap to close an opening, a strip secured to the inside surface of the wall to cover the opening and having a flap which is adhesively attached to the wall flap to open therewith, the attachment comprising a sheet with a discharge opening and a smaller air inlet opening above it attached to said strip inside of the wall, a fold line below the discharge opening to bring the lower edge of the sheet just below the discharge opening, and a spout projection from the lower edge of the sheet having inwardly foldable side edges to define and taper the spout at its end, the edges of the spout being foldable inwardly and the spout folded upwardly on said fold line to overlie said openings before the attachment is applied to the inside of a milk container.

8. A cream draw-off attachment for the inside of a paper milk container having a pouring aperture in the wall with a hinged flap to close an opening, comprising a strip secured to the inside surface of the wall to cover the opening and having a flap which is adhesively attached to the wall flap to open therewith, the attachment including a sheet attached to the strip inside of the wall having a cream discharge opening and an air in'et above it, a fold line below the discharge opening and a spout projection at the lower edge to cover the openings when it is moved upwardly by folding the sheet on said fold line, the edges of the spout being folded over inwardly before it is moved upwardly and a tab projecting outwardly from the spout to provide means for engaging and moving it outwardly.

9. A cream draw-off attachment for the inside of a paper milk container having a pouring aperture in the wall with a hinged flap to close an opening, comprising a strip secured to the inside surface of the wall to cover the opening and having a flap which is adhesively attached to the wall flap to open therewith, the attachment including a paper like sheet attached to the strip inside of the wall having an angular cream discharge opening with one pointed extremity of the opening disposed lowermost and with an upper air inlet opening, a discharge spout at the lower edge foldable over both openings and extending outwardly and downwardly from the discharge opening when the spout is folded outwardly, and the central surface of the spout having central sets of indentations which tend to attract direct and centralize cream and milk discharged from said discharge opening.

JOHN PAUL JONES.

REFERENCES CITED

The following references are of record in the file of this patent:

UNITED STATES PATENTS

| Number | Name | Date |
|---|---|---|
| 883,738 | Patterson et al. | Apr. 7, 1908 |
| 1,026,828 | Pierce | May 21, 1912 |
| 1,160,571 | Buffington | Nov. 16, 1915 |
| 2,154,584 | Rossi | Apr. 18, 1939 |
| 2,218,670 | Bennett | Oct. 22, 1940 |
| 2,263,957 | Sooy | Nov. 25, 1941 |
| 2,288,914 | Monroe | July 7, 1942 |
| 2,311,333 | French | Feb. 16, 1943 |